United States Patent Office 2,764,570
Patented Sept. 25, 1956

2,764,570

COPOLYMERS OF ACRYLONITRILE WITH DICARBOXYLIC ACID HYDRAZIDES

Ernest Jan Kowolik and James Wotherspoon Fisher, Spondon, near Derby, England, assignors to British Celanese Limited, a corporation of Great Britain No Drawing. Application June 30, 1953, Serial No. 365,242

Claims priority, application Great Britain July 21, 1952

15 Claims. (Cl. 260—29.6)

This invention provides a new series of polymers.

In this specification the term "polymer" is intended to include copolymers as well as homopolymers. The new polymers of the invention are polymers of derivatives of $\alpha,\beta$-mono-olefinic carboxylic acids, the said derivatives containing the group: >N—N<, preferably in the form of the group: >N—NH$_2$. We have found that homopolymers and copolymers can be formed from such derivatives, for instance by the action of heat, ultra violet radiation or a free-radical-producing polymerization catalyst. The copolymers are of greater utility than the homopolymers and the copolymers with acrylonitrile are particularly valuable. The invention will therefore be described with particular reference to these copolymers.

As is well known, fibres can be formed of poly-acrylonitrile which are particularly valuable on account of their high tenacity, heat softening point and resistance to water and most organic liquids, but which have the serious disadvantage of extremely poor dye receptivity. We have now found that acrylonitrile can be copolymerized with derivatives of an $\alpha,\beta$-olefinic carboxylic acid that contain the group >N—N< to give copolymers from which fibres can be made combining the advantages referred to above with good affinity for acid and/or basic dyes.

Derivatives of the kind specified above can be made by reaction between the olefinic acid or its anhydride and hydrazine or a substituted hydrazine. Those derivatives are preferred which contain the group >N—NH$_2$. The derivative may be a salt of the acid with hydrazine or a substituted hydrazine or may be a compound in which a hydrazine residue or substituted hydrazine residue is bound covalently to the acid radical. The derivative may be cyclic or linear.

Among derivatives of hydrazine or a substituted hydrazine and an $\alpha,\beta$-olefinic carboxylic acid, mention may be made of hydrazides and hydrazinium salts of $\alpha,\beta$-olefinic monocarboxylic acids such as acrylic and methacrylic acid, e. g. CH$_2$:CH.CO.NH.NH$_2$ and [CH$_2$:CH.COOH] [NH$_2$.NH$_2$]; of the mono-hydrazides, mono-N-amino imides and mono-hydrazinium salts of $\alpha,\beta$-olefinic dicarboxylic acids such as maleic and itaconic acid, e. g. HO.CO.CH:CH.CO.NH.NH$_2$,

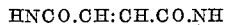 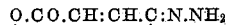

and [HO.CO.CH:CH.COOH] [NH$_2$.NH$_2$]; of the corresponding dihydrazides and dihydrazinium salts of such dicarboxylic acids, e. g. H$_2$NNH.CO.CH:CO.NH.NH$_2$ and [HO.CO.CH:CHCO.OH] [NH$_2$NH$_2$]$_2$; and of similar compounds to those specified above, derived not from hydrazine itself but from substituted hydrazines, e. g. mono-alkyl, mono-aralkyl and mono-aryl hydrazines, e. g. phenyl hydrazine, benzyl hydrazine and especially methyl and ethyl hydrazines and mono-acyl hydrazines, e. g. mono-acetyl hydrazine and semi-carbazide. The olefinic group of the acid should have at least one unsubstituted hydrogen atom and, as indicated above, should be adjacent to at least one carboxyl group. Derivatives (corresponding to those referred to above) of fumaric acid are in general less suitable on account of instability (which may even involve a danger of explosion) than are the derivatives of maleic and itaconic acid. The best results so far have been obtained with mono-hydrazine derivatives, and especially mono-hydrazinium salts, of olefinic dicarboxylic acids, especially maleic acid.

The copolymerization of the hydrazine derivative and acrylonitrile is preferably effected in an aqueous medium. Dispersing agents and/or protective colloids may or may not be present. In general, conditions similar to those adopted in the homo-polymerization of acrylonitrile are suitable. Thus for initiating the polymerization it is preferred to employ ammonium persulphate or an alkali metal persulphate or an azodinitrile, e. g. azo-di-isobutyronitrile, but many other substances capable of generating free radicals under appropriate conditions can be employed. Such substances include: hydrogen peroxide; acyl peroxides, e. g. benzoyl peroxide, acetyl peroxide, acetyl benzoyl peroxide and lauryl peroxide; dialkyl peroxides and alkyl hydroperoxides; cyclic-ether peroxides; diazoaminobenzene, benzene diazoacetate, benzene diazotriphenyl methane, nitrosoacetanilide and tetraphenylsuccinonitrile. The initiator may be activated by the presence of suitable reducing agents, for example sulphur dioxide, sulphites, bisulphites, hydrosulphites, hypophosphites and ferrous salts. In a redox system, using, for instance, one of the specified sulphur compounds as reducing agent, oxygen may serve as the oxidizing component. In general, however, we prefer to exclude oxygen altogether and carry out the polymerization under an inert atmosphere in a reaction medium that does not contain free oxygen. Other agents that can be used to activate the initiator include soluble salts of metals such as silver and copper, heavy metal complex salts such as alkali metal ferri cyanides and cobalti cyanides, organic compounds of the kind which catalyse oxidation-reduction biological processes and, in general, substances that catalyse the decomposition of per-compounds. Although, as indicated above, it is preferred to carry out the polymerization in an aqueous medium, this medium may contain organic liquids capable of modifying the course of the polymerization, e. g. by acting as chain-transfer agents. Such liquids include aromatic hydrocarbons, such as benzene and toluene, cyclo-aliphatic hydrocarbons, such as cyclohexane, cyclo ethers such as dioxane, and halogenated aliphatic hydrocarbons such as carbon tetra chloride and hexachlorethane.

To obtain relatively high heat softening point in the polymer, the hydrazine derivative should be present in a minor proportion, for example the relative molar proportions of acrylonitrile to the hydrazine derivative in the copolymer should be at least 3:1, e. g. between 4:1 and 5:1 and preferably even higher, e. g. from 8:1 to 10:1 or above 10:1. The best results qua softening point have been obtained in copolymers in which the molar ratio of acrylonitrile to the hydrazine derivative is between 10:1 and 95:1. In the copolymerization the acrylonitrile is consumed at a more rapid rate than the the hydrazine derivatives so that the average molar proportion of the hydrazine derivative in the copolymer is less than that in the initial monomer mixture. This differential rate of polymerization between the two monomers may be allowed for by adding the acrylonitrile at intervals in the course of polymerization, the whole of the hydrazine derivative being added initially.

The following examples, in which all the parts are by weight, illustrate the production of copolymers according to the invention:

*Example 1*

An autoclave was charged with a reaction mixture of the following composition:

100 parts of a mixture of acrylonitrile and the mono-hydrazinium salt of maleic acid in molar proportions of 9:1
200 parts of water
4 parts of "Base W" (a sulphonated higher paraffin emulsifying agent)
0.8 part of azo-di-isobutyronitrile The temperature was kept at 73 to 75° C. for 2 hours during which the charge was stirred vigorously. The polymer was then recovered from the reaction mixture by filtration and washed with water. It was in the form of an ivory coloured powder which did not soften or decompose below 210° C. It was insoluble in water, ethanol, acetone, benzene and nitro-methane but dissolved in nitromethane-water, dimethylformamide and ethylene carbonate. The viscosity of a 1% solution in dimethylformamide at 20° C. was 2.69 css.

*Example 2*

The process was carried out as in Example 1, except that the reaction medium had the following composition:

100 parts of water
2 parts of polyvinyl alcohol
0.4 part of azo-di-isobutyronitrile and polymerization was continued for three hours. The viscosity of 1% solution in dimethylformamide at 20° C. was 3.0 css.

*Examples 3 and 4*

The process was carried out as described in Examples 1 and 2 respectively but substituting maleic mono-hydrazide for the mono-hydrazinium salt of maleic acid.

*Example 5*

The process was carried out as in Example 2 but omitting the polyvinyl alcohol. The polymer was obtained in the form of white "pearls." The viscosity of a 1% solution in dimethylformamide at 20° C. was 3 css.

*Example 6*

The process was carried out as in Example 4 except that the reaction medium had the following composition:

20 parts of water
90 parts of benzene
0.5 part of benzoyl peroxide.

*Example 7*

The process was carried out as described in Example 2 except that the reaction medium had the following composition:

300 parts of water
1 part of ammonium persulfate

The temperature was controlled at 65° C. and polymerization was stopped after 30 minutes.

*Example 8*

The process wase carried out as described in Example 2 except that the reaction medium had the following composition:

400 parts of water
2 parts of ammonium persulfate and the reaction was carried out for 2½ hours at 75° C.

In a similar way, hydrazine derivatives of the kind referred to above can be copolymerized with other olefinic compounds capable of polymerization by a free-radical mechanism to give polymers of high average molecular weight especially compounds of the formula $CH_2{:}C(X)Y$ where X is hydrogen, methyl or an electro-negative element or group and Y is an electro-negative element or group. (By an electro-negative element or group is meant one such that a compound containing it has a higher dipole moment than a similar compound in which said element or group is replaced by hydrogen.) Among such olefinic compounds are styrene and substituted styrenes, e. g. styrenes in which a hydrogen atom in the nucleus is replaced by a halogen atom or by a lower alkyl or lower alkoxy group; vinyl-chloride, vinylidene chloride, tetrafluoroethylene and the like halogen-substituted ethylenes; vinyl esters and isopropenyl esters such as vinyl acetate, and isopropenyl acetate; derivatives of acrylic acid, such as methyl acrylate, ethyl acrylate, methyl methacrylate, butyl methacrylate, methacrylic nitrile, acrylamide and methacrylamide; methylene malononitrile, itaconic nitrile and itaconic esters; and lower alkyl vinyl ketones, e. g. methyl vinyl ketone. The hydrazine derivative may also be copolymerized with a diene such, for example, as butadiene, isoprene, chloroprene or 2-cyanobutadiene. Monomers which, although incapable of homopolymerization, can be copolymerized, e. g., maleic anhydride, diethyl maleate, diethyl fumarate and other derivatives of maleic and fumaric acids, can also be copolymerized with the hydrazine derivative especially in the presence of a major proportion of a third more active monomer, e. g. acrylonitrile, methacrylonitrile, vinylidene chloride or styrene. Of particular value are the products obtained by copolymerizing the hydrazine derivative with a monomer containing both strongly polar atoms or groups and mobile hydrogen. Examples of such monomers are acrylonitrile, methylene malononitrile and vinylidene chloride. By copolymerizing one of these compounds with a minor proportion of the hydrazine derivative, copolymers can be obtained which combine high heat softening point with relatively good dye affinity and from which filaments and films of good tenacity can be obtained.

Filaments can be obtained from the fibre-forming copolymers of the invention by wet spinning, dry spinning or melt spinning according to the solubility properties and softening point of the particular copolymer. The copolymers which we have found of most value for this purpose are those containing a high proportion of acrylonitrile. Such copolymers are in general soluble in the same solvents as polyacrylonitrile, e.g. in dimethyl formamide, ethyl carbonate, γ-butyrolactone, sulpholane and concentrated aqueous solutions of nitromethane. Thus, for example, from the copolymer of Example 1 a yarn was made by wet spinning a dimethylformamide solution of the copolymer into a coagulating bath of water. The yarn showed good affinity for direct cotton dyes, e. g., "Chlorazole Fast Scarlet 4B. S." and "Chlorazole Fast Yellow B400" and for acid dyes, e. g., "Artol Blue B" and "Lissamine Blue B."

From filamentary materials having a basis of the polymers of the invention, whether composed of continuous filaments or staple fibres, fabrics, e. g. woven, knitted or felted fabrics, can be made. The invention includes the use of filamentary material of the copolymers in admixture with other filamentary materials, e. g. cotton, wool, silk and synthetic fibres, e. g. those having a basis of regenerated cellulose, cellulose esters, nylons, polyethylene terephthalate, poly-4-amino-1,2,4-triazoles, polyacrylonitrile and copolymers of acrylonitrile with vinyl chloride and with vinylidene chloride and of vinyl chloride with vinylidene chloride. In such mixed textile materials advantage may be taken of the special dye affinity of the copolymers of the invention to produce useful cross-dyeing effects.

In addition to textile products, other products can be fabricated from the copolymers of the invention. Thus, for example, films may be made from solutions of the copolymers by the evaporative method or by wet casting.

From thermoplastic copolymers of the invention moulded and extruded products can be made.

Filaments made from the copolymers of the invention can be oriented by stretching, e. g. in steam or hot water, or in a dry heat softened condition, to give products of high tenacity. The stretched filamentary materials may be stabilized against shrinkage due to exposure in use to elevated temperatures, by a heat treatment, carried out at a higher temperature than any to which the material will be exposed in normal use. The heat softening point and resistance to swelling by water and organic liquids of the copolymers of the invention can be increased by chemical treatments designed to cross-link the polymer chains by virtue of the replaceable hydrogen in the hydrazine groups. Suitable cross-linking agents include phthalic anhydride, adipic acid and other dicarboxylic acids and anhydrides, di- and poly-isocyanates and aldehydes such as formaldehyde and glyoxal. The invention includes chemical after-treatment of the polymers directed to removing part of the content of N,N groups, e. g. by acid hydrolysis.

Besides serving as co-monomers from which a useful series of copolymers can be made, the hydrazine derivatives can function as transfer agents in regulating the polymerization of olefinic substances by free-radical mechanisms. They may also serve to initiate such polymerizations.

Having described our invention, what we desire to secure by Letters Patent is:

1. A copolymer of acrylonitrile with a derivative of an $\alpha,\beta$ monoolefinic dicarboxylic acid, said derivative being selected from the class consisting of hydrazides and hydrazinium salts of said acid.

2. A copolymer of acrylonitrile with a monohydrazide of an $\alpha,\beta$ monoolefinic dicarboxylic acid.

3. A copolymer of acrylonitrile with a monohydrazinium salt of an $\alpha,\beta$ monoolefinic dicarboxylic acid.

4. A copolymer of acrylonitrile with the monohydrazide of maleic acid.

5. A copolymer of acrylonitrile with the monohydrazinium salt of maleic acid.

6. A copolymer of acrylonitrile with a derivative of an $\alpha,\beta$ monoolefinic dicarboxylic acid, said derivative being selected from the class consisting of hydrazides and hydrazinium salts of said acid, wherein the molar ratio of acrylonitrile to said derivative is between 4:1 and 95:5.

7. A copolymer of acrylonitrile with a monohydrazide of an $\alpha,\beta$ monoolefinic dicarboxylic acid wherein the molar ratio of acrylonitrile to monohydrazide is between 4:1 and 95:5.

8. A copolymer of acrylonitrile with a monohydrazinium salt of an $\alpha,\beta$ monoolefinic dicarboxylic acid wherein the molar ratio of acrylonitrile to monohydrazinium salt is between 4:1 and 95:5.

9. A copolymer of acrylonitrile with the monohydrazide of maleic acid, wherein the molar ratio of acrylonitrile to monohydrazide is between 85:15 and 95:5.

10. A copolymer of acrylonitrile with the monohydrazinium salt of maleic acid, wherein the molar ratio of acrylonitrile to monohydrazinium salt is between 85:15 and 95:5.

11. Process for making a copolymer of acrylonitrile with a derivative of an $\alpha,\beta$ monoolefinic dicarboxylic acid, said derivative being selected from the class consisting of hydrazides and hydrazinium salts of said acid, wherein the acrylonitrile and the carboxylic acid derivative are copolymerised by the action of a free-radical-producing polymerisation catalyst in a liquid medium and the initial molar ratio of acrylonitrile to carboxylic acid-derivative is between 4:1 and 10:1.

12. Process for making copolymers which comprises copolymerizing acrylonitrile with maleic monohydrazide, in aqueous emulsion, the initial molar ratio of acrylonitrile to the hydrazide being between 85:15 and 95:5, and the polymerization being initiated with the aid of a free-radical-producing polymerization catalyst.

13. Process for making copolymers which comprises copolymerizing acrylonitrile with maleic monohydrazinium salt, in aqueous emulsion, the initial molar ratio of acrylonitrile to the hydrazinium salt being between 85:15 and 95:5, the polymerization being initiated with the aid of a free-radical-producing polymerization catalyst.

14. A solution in aqueous nitro-methane of a copolymer of acrylonitrile with the monohydrazinium salt of maleic acid, the molar ratio of acrylonitrile to the hydrazinium salt in said copolymer being between 4:1 and 95:5.

15. A solution in ethylene carbonate of a copolymer of acrylonitrile with the monohydrazinium salt of maleic acid, the molar ratio of acrylonitrile to the hydrazinium salt in said copolymer being between 4:1 and 95:5.

References Cited in the file of this patent

UNITED STATES PATENTS

| 2,395,642 | Prichard | Feb. 26, 1946 |
| 2,615,862 | McFarlane | Oct. 28, 1952 |

FOREIGN PATENTS

| 497,031 | Great Britain | Dec. 12, 1938 |